Nov. 1, 1938.　　A. T. SCHEIWER　　2,135,222
COUPLING
Filed Feb. 4, 1936　　2 Sheets-Sheet 2

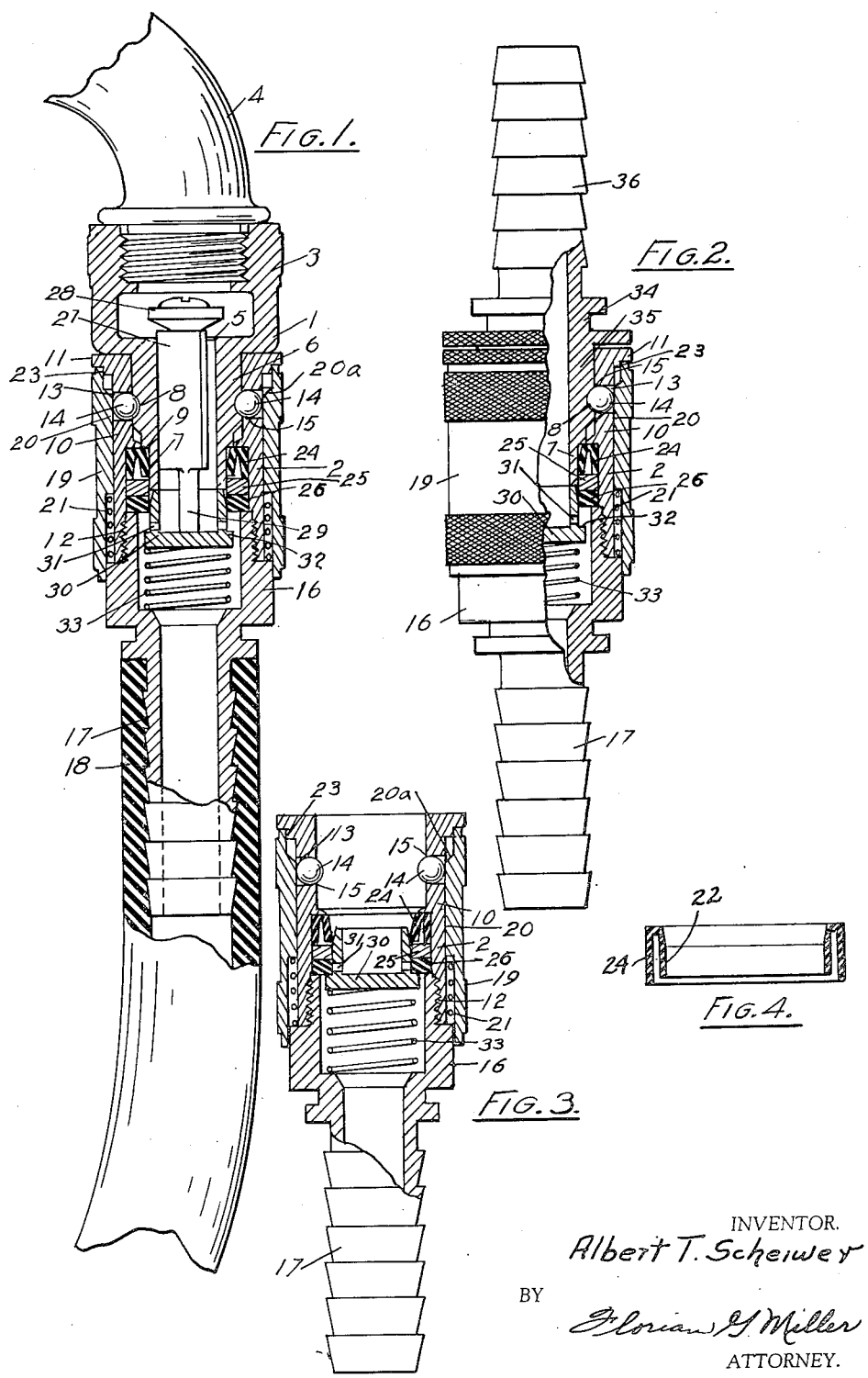

INVENTOR.
Albert T. Scheiwer
BY
Florian G. Miller
ATTORNEY.

Patented Nov. 1, 1938

2,135,222

UNITED STATES PATENT OFFICE 2,135,222

COUPLING

Albert T. Scheiwer, Erie, Pa.

Application February 4, 1936, Serial No. 62,251

7 Claims. (Cl. 284—19)

This invention relates generally to quickly detachable couplings and more particularly to couplings having a check valve combined therewith.

All devices of this character made according to the prior art, and with which I am familiar, have had no check valve which operated automatically upon the disconnection of the coupling. Manual means was always necessary to check the flow from the feed line before the disconnection took place. This was particularly so when both sections of the pipe or hose contained a liquid under pressure after the disconnection and both the feeding and receiving lines had to be sealed.

It is, accordingly, an object of my invention to provide an automatically operated check valve in a quickly detachable coupling which operates to check the flow of fluid in either one of the lines or in both the feeding and the receiving lines.

Another object of my invention is to provide a quickly detachable coupling combined with a check valve which is simple in construction, easy to operate, economical in manufacture, and cheap in cost.

Another object of my invention is to provide means for preventing the disconnection of a quickly detachable coupling except by manual intervention.

Another object of my invention is to provide an automatically operated check valve combined with a quickly detachable swivel coupling with novel fluid sealing means.

Other objects of my invention will become evident from the following detailed description, taken in conjunction with the accompanying drawings, in which—

Fig. 1 is a medial cross-section of my novel quickly detachable coupling with sealing means provided for both the male and female coupling members.

Fig. 2 is a side elevational view partly in cross-section of my novel coupling with a different type of male member than the male member shown in Fig. 1.

Fig. 3 is a medial cross-section of the female coupling member shown in Figs. 1 and 2.

Fig. 4 is a medial cross-section of the U-shaped washer used in my coupling.

Figure 5:
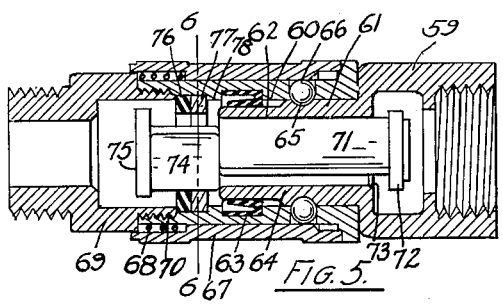
Fig. 5 is a medial cross-section of a modified form of my novel double check coupling.
Figure 6:
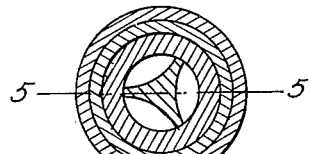
Fig. 6 is a view taken on the line 6—6 of Fig. 5.

Referring to the drawings, the coupling shown in Fig. 1 comprises a male member 1 and a female member 2. The male member 1 has an internally threaded head 3 for attachment to a faucet 4, and a valve seat 5 is formed internally thereof. The connecting section 6 of the male member 1 has a reduced tip portion 7 and an intermediate peripheral groove 8 and a shoulder 9.

The female member 2 comprises a substantially tubular section 10 having a radially extending flange 11 on one end thereof and an internally threaded portion 12 on the other end thereof. Radially extending apertures 13 in the section 10 hold ball members 14, the ball members 14 being held from falling inwardly by a slight restriction of the inner portion 15 of the apertures 13. The ball members 14 engage the groove 8 on the male member 1 to secure the male and female members 1 and 2 together as shown in Fig. 1. An attaching section 16 having a serrated portion 17 for attachment of a hose 18 is threadably engaged with the threaded portion 12 of the female member 2. A sleeve 19 having a depending portion 20 is telescopically disposed on the tubular section 10 and moves longitudinally over the attaching section 16 when the ball members 14 are released from engagement with the groove 8 to disconnect the male and female members 1 and 2. A spring member 21 urges the sleeve 19 forwardly against the flange 11 to a locking relationship with ball members 14 and the groove 8 when the male member 1 is inserted in the female member 2. The tapered portion 20a of the depending portion 20 causes a camming action on the ball members 14 when the sleeve 19 is urged forwardly by the spring member 21. A shoulder 23 is formed adjacent the flange 11 to provide a support for the front end of the sleeve 19, the rear portion thereof being supported by the outer periphery of the attaching section 16. Suitable washers 24, 25, and 26 are disposed in the tubular section 10, washer 24 being preferably a U-shaped washer as shown in Fig. 4. The inner annular portion 22 of the U-shaped washer 24 is of less width than the outer annular portion thereof permitting the liquid or the like passing through the coupling to enter between the inner annular portion 22 and the outer annular portion of the washer 24 to provide a more perfect seal.

A valve stem 27 having a head 28 attached thereto which may be built integral therewith is disposed in the bore of the male member 1 and the seating surface of the head 28 normally seats on the valve seat 5 when the male and female members 1 and 2 are disconnected to provide an automatic check for the fluid in the male member 1. The lower end 29 of the valve stem 27 is reduced in size and extends into a cup-shaped sealing member 30 having radially extending apertures 31 to provide for the flow of fluid and an outwardly extending seating portion 32 which seats on the washer 26 under pressure of the coil spring 33 to provide a check for the fluid in the female member 2 when the male and female members 1 and 2 are disconnected.

In operation, the connecting portion 6 of the male member 1 is inserted in the tubular section 10 of the female member 2 until the groove 8 on the connecting portion 6 of the male member 1 is in alignment with the apertures 13 in the tubular section 10. The reduced portion 7 of the connecting portion 6 is of such diameter that no contact is made with the ball members 14 when they are disposed in their innermost position thus saving wear and tear on the ball members 14 as well as on the reduced portion 7. The sleeve 19 having been moved longitudinally to permit the release of the ball members 14 when the connecting portion 6 of the male member 1 was inserted, is released when the groove 8 is in alignment with the apertures 13 thereby causing a camming action on the ball members 14 by the tapered portion 20a of the depending portion 20 to force them inwardly into engagement with the groove 8 thereby securing the male and female members 1 and 2 together. When the connecting section 6 of the male member 1 is inserted into the female member 2, the end portion 29 of the stem 27 comes in contact with the cup-shaped member 30 to move the head 28 of the stem 27 away from its seat 5 to permit the free flow of fluid from the male member 1.

The inward thrust of the connecting portion 6 of the male member 1 into the female member 2 brings the reduced portion 7 of the connecting portion 6 in contact with the cup-shaped member 30 and moves it longitudinally against the force of the spring member 33 permitting the free flow of fluid from or to the female member 2 through the apertures 31 in the cup-shaped member 30.

Upon disconnection of the male and female members 1 and 2, the male member 1 is released when the sleeve 19 is moved longitudinally to release the ball members 14 in contact with the groove 8. The outward movement of the male member 1 releases the cup-shaped member 30 and the spring member 33 forces the seat 32 of the member 30 against the washer 26 to check the flow of fluid from the female member 2. The outward movement of the male member 1 also releases the valve stem 27 and permits the stem 27 to move longitudinally until its head 28 seats on the valve seat 5 to provide a liquid seal for the liquid in the line leading to the male member 1 of the coupling.

Fig. 2 shows a coupling utilizing the same female member 2 of Fig. 1 with a male member 34 having no provision for checking the flow of fluid from the male member 34 when the coupling is disconnected. The male member 34 has the same connecting portion 35 as the connecting portion 6 of the male member 1 of Fig. 1. The outer connecting portion 36 of the male member 34 is serrated to receive a hose (not shown) although any other form of connecting portion could be provided. This coupling may be used to connect two sections of hose with the female member 2 connected to the feeding hose in order that the cup-like member 30 may act as an automatic check of the fluid in the feed line when the male and female members 34 and 2 are disconnected as described in reference to the structure in Fig. 1. The coupling operates in every way as the coupling in Fig. 1 except that one check valve is eliminated.

Figure 7:
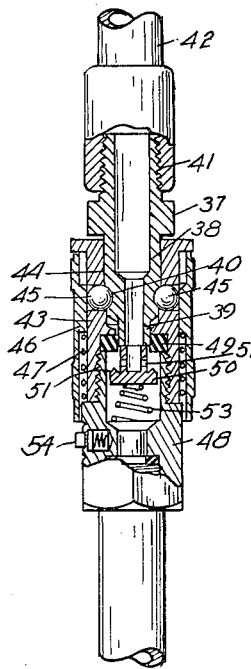
Fig. 7 is a side elevational view in cross-section of my novel coupling with a check only provided in the female member.
Figure 8:
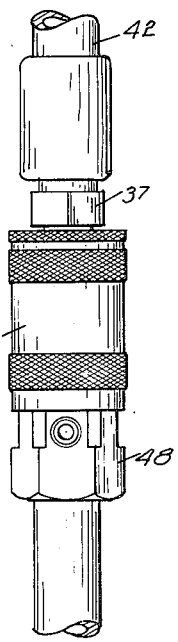
Fig. 8 is a side elevational view of the coupling shown in Fig. 7.
Figure 9:
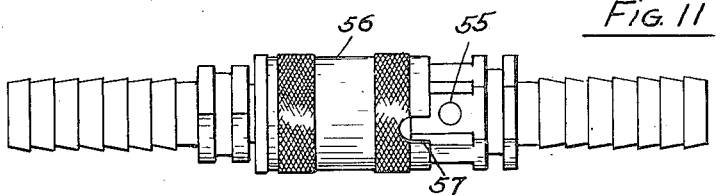
Fig. 9 is a side elevational view of the coupling shown in Figs. 7 and 8 with a different form of safety device.

A coupling shown in Fig. 7 is of substantially the same construction and operates on identically the same principle as the coupling shown in Fig. 2 except for a few minor changes in construction. The male member 37 has a connecting portion 38 with a reduced portion 39 and peripheral groove 40 and an outer threaded portion 41 for connection to a pipe line 42. The female member 43 comprises a tubular section 44, ball members 45, a telescopically disposed sleeve 46, spring 47, attaching section 48 and a washer 49, all of substantially the same construction and operation as the coupling shown in Fig. 2. Instead of using the three washers 24, 25, and 26 as shown in Fig. 1, only one washer 49 is disposed in the tubular section 44. The cup-shaped member 50 having a seating surface 51 and apertures 52 is urged against the washer 49 by the spring 53 to provide a fluid seal for the female member 43 when the male and female members 37 and 43 are disconnected. When male and female members 37 and 43 are connected as in Fig. 7, the connecting portion 38 of the male member 37 forces the seating surface 51 of the cup-shaped sealing member 50 away from the washer 49 to permit the free flow of fluid as described in the previous constructions. A spring-urged head 54 on the attaching section 48 prevents the sleeve 46 from being moved out of locking engagement with the ball members 45 until the head 54 is depressed to permit the sleeve 46 to move longitudinally a sufficient distance to permit the outward radial movement of the ball members 45. This is a safety means to prevent unlocking of the male and female members. Fig. 9 shows another form of safety means wherein a head 55 normally restricts longitudinal movement of the sleeve 56 but a slot 57 in the sleeve 56 permits longitudinal movement when it is in alignment with the head 55 to free ball members as in Fig. 7 and permit the disconnection of the coupling.

Fig. 5 shows another form of double check valve combined with male member 59 and a female member 60. The male member 59 has a connecting portion 61 with a reduced portion 62 sealed by a U-shaped washer 63 disposed in the tubular section 64 of the female member 60. A peripheral groove 65 on the connecting portion 61 of the male member 59 engages the ball members 66 to secure the male and female members together. The sleeve 67, telescopically disposed on the tubular section 64, locks the ball members 66 in engagement with the groove 65 and is urged to locking position by the spring member 68. A connecting section 69 engages the threaded portion 70 of the tubular section 64. A valve stem 71 having a head 72 which seats on a valve seat 73 formed in the male member 59 seals the male section 59 when the male and female members 59 and 60 are disconnected. Valve stem 74 in the female member 60 has an integral head 75 which seats on a washer 76 to seal the flow of fluid in the female member 60 when the male and female members 59 and 60 are disconnected. A washer 77 is disposed adjacent the washer 76 and an internally disposed shoulder 78 in the female member 60. In operation, when the connecting portion of the male member 59 is inserted into the female member 60, the head 75 of the stem 74 is moved longitudinally away from the washer 76 to permit the free flow of fluid. The stem 71 in the male member 59 is also moved longitudinally by the stem 74 thereby separating the head 72 and the valve seat 73 to permit the free flow of fluid when the male and female members 59 and 60 are connected together. The principle of operation and also this general construction is disclosed in Fig. 1.

Figure 10:
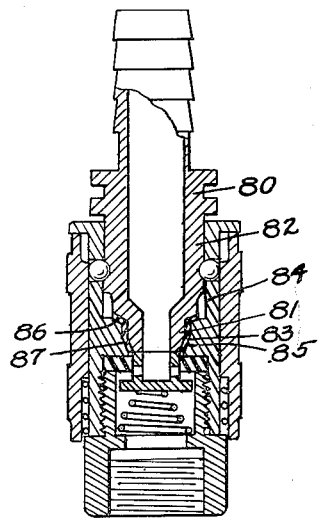
Fig. 10 is a medial cross-sectional view of a modified form of male member with combined sealing means.

The coupling shown in Fig. 10 is the same as the coupling in Fig. 7 with the exception that the male member 80 has the reduced portion 81 of its connecting portion 82 covered by a washer 83 of any suitable material to protect the reduced portion 81 and to provide a fluid seal when the male member 80 and the female member 84 are connected together. The shoulder 85 has two seating surfaces 86 and 87 providing a double seal.

It will be noted that the outer connecting portions may be externally or internally threaded for receiving pipes, faucets, and the like, or they may be provided with serrated portions as shown in Figs. 2 and 9 for connection to a hose.

Figure 11:
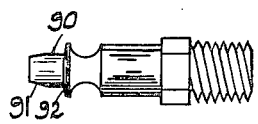
Fig. 11 is a medial cross-sectional view of a male member which is adaptable for use with the female member of Fig. 7.

Fig. 11 shows a form of male member which is almost identical to the male member 80 of Fig. 10 and is adapted to have a washer disposed over its reduced end portion 90 as male member 80 in Fig. 10. This washer which is 83 in Fig. 10 acts as a protection as well as a sealing member with two points of contact 91 and 92. It will be apparent that two points of contact 86 and 87 in Fig. 10 provide a very excellent sealing means.

I have therefore provided a coupling which is quickly detachable, interchangeable with the use of a minimum number of parts, efficient sealing means and safety means, and one with an automatically operated check valve which may be used for either the male or the female coupling member.

Various changes may be made in the specific embodiment of the present invention without departing from the spirit thereof, or within the scope of the appended claims.

What I claim is:

1. A tubular coupling comprising a male member having a connecting portion with a peripheral groove, a female member for receiving the connecting portion of said male member, ball locking means disposed in said female member for engaging said groove in said male member, means disposed in said female member for sealing the end of said connecting portion when said members are connected together and for providing a seating surface, a connecting member secured to said female member to permit the free removal of said last mentioned means, and a valve member in the female member disposed to seat on said last mentioned means when said coupling is disconnected to seal the opening therein, said valve member being movable longitudinally by the connecting portion of said male member when said male and female members are connected together to unseal the opening in the female member.

2. A tubular coupling as set forth in claim 1 wherein a valve member is provided in said male member adapted to engage the valve member in said female member when said male and female members are connected together to unseal the opening in said male member.

3. A tubular coupling comprising a male member having a connecting portion with a peripheral groove, a female member for receiving the connecting portion of said male member, ball members disposed in said female member for engagement with said groove on said male member for locking said male and female members together, a sleeve surrounding said female member for holding said balls in engagement with said groove of said male member, a washer in said female member for sealing the end of said connecting portion of said male member, a seating washer in said female member, a valve member disposed to seat on said seating washer in said female member when said coupling is disconnected to seal the opening in said female member, said valve member being movable longitudinally by the connecting portion of said male member when said male and female members are connected together to unseal the opening in the female member, and a connecting member on said female member to permit removal of said seating washer and said valve member.

4. A tubular coupling as set forth in claim 3 wherein the washer for sealing the end of the connecting portion of the male member is an annular washer, the internal wall of which is tapered.

5. A coupling as set forth in claim 3 wherein a valve member is disposed in the male member to seal the male member when the coupling is disconnected and is movable longitudinally by the valve member in the female member when the male and female members are connected to unseal the opening in the male member.

6. A swiveling coupling comprising a male member having a connecting portion with a peripheral groove, said male member having a valve seat formed internally thereof, a female member for receiving the connecting portion of said male member, ball members disposed in said female member for engagement with the peripheral groove on said male member to secure said male and female members together, a sleeve surrounding said female member for locking said balls in engagement with said groove, an annular washer, U-shaped in cross-section, disposed in said female member to seal the end of said male member, a seating washer disposed in said female member, a valve member disposed to seat on said seating washer to seal the female member when said male and female members are disconnected, a connecting member on said female member to permit the removal of said seating washer and said valve member in said female member, and a valve member in said male member for sealing said male member when said male and female members are disconnected, said last mentioned valve member being movable longitudinally by said valve member in said female member when said male and female members are connected together to unseal said male member.

7. A coupling comprising a male member having a connecting portion, a female member for receiving the connecting portion of said male member, locking means for said male and female members, a U-shaped washer for sealing the end of the connecting portion of said male member when said male and female members are connected together, a seating washer disposed in said female member to form a seating surface, a connecting member secured to said female member to permit free removal of said washers, a valve member disposed to seat on said seating washer in said female member when said coupling is disconnected to seal the opening in said female member, and a valve member in said male member for automatically sealing said male member upon disconnection of said male and female members, said valve member in said female member being movable longitudinally by the connecting portion of said male member to unseal the opening in the female member.

ALBERT T. SCHEIWER.